US009907039B2

United States Patent
Yamamoto et al.

(10) Patent No.: US 9,907,039 B2
(45) Date of Patent: Feb. 27, 2018

(54) SENSOR INFORMATION PROCESSING APPARATUS, SENSOR INFORMATION PROCESSING METHOD, AND SENSOR INFORMATION PROCESSING PROGRAM

(71) Applicant: SUMITOMO ELECTRIC INDUSTRIES, LTD., Osaka-shi, Osaka (JP)

(72) Inventors: Hirotsugu Yamamoto, Osaka (JP); Yoshizo Tanaka, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 190 days.

(21) Appl. No.: 14/759,673

(22) PCT Filed: Jun. 17, 2014

(86) PCT No.: PCT/JP2014/066009
§ 371 (c)(1),
(2) Date: Jul. 8, 2015

(87) PCT Pub. No.: WO2015/005071
PCT Pub. Date: Jan. 15, 2015

(65) Prior Publication Data
US 2015/0358933 A1    Dec. 10, 2015

(30) Foreign Application Priority Data
Jul. 10, 2013  (JP) .................................. 2013-144749

(51) Int. Cl.
*H04L 12/28*  (2006.01)
*H04W 56/00*  (2009.01)
(Continued)

(52) U.S. Cl.
CPC .......... *H04W 56/0015* (2013.01); *H04Q 9/00* (2013.01); *H04W 4/005* (2013.01);
(Continued)

(58) Field of Classification Search
CPC . H04W 56/0015; H04W 4/005; H04W 4/006; H04W 84/18; H04Q 9/00;
(Continued)

(56) References Cited

U.S. PATENT DOCUMENTS

2008/0250301 A1*  10/2008  Mukhopadhyay .... H04L 1/0036
                                                        714/786
2008/0267181 A1*  10/2008  Monga .................... H04L 45/00
                                                        370/390
(Continued)

FOREIGN PATENT DOCUMENTS

JP    2004-272403 A    9/2004
JP    2004-274931 A    9/2004
JP       4237134 B2    3/2009

*Primary Examiner* — Noel Beharry
*Assistant Examiner* — Lionel Preval
(74) *Attorney, Agent, or Firm* — Drinker Biddle & Reath LLP (57) ABSTRACT

A sensor information processing apparatus according to one embodiment of the present invention is a sensor information processing apparatus 251 for processing measured result from a plurality of sensors 202, and it includes a sensing information obtaining section 12 for obtaining sensing information including the measured results in the sensors 202 from radio signals received from the sensors 202, and a time synchronizing section 13 for temporally relate the measured results included in the sensing information obtained by the sensing information obtaining section 12 to each other.

3 Claims, 6 Drawing Sheets

(51) Int. Cl.
  *H04W 4/00*   (2018.01)
  *H04Q 9/00*   (2006.01)
  *H04J 3/06*   (2006.01)
(52) U.S. Cl.
  CPC ........... *H04W 4/006* (2013.01); *H04J 3/0667* (2013.01); *H04Q 2209/40* (2013.01); *H04Q 2209/845* (2013.01)
(58) Field of Classification Search
  CPC .......... H04Q 2209/40; H04Q 2209/845; H04J 3/0067; H04J 3/0638; H04L 67/12; H04B 7/2662
  See application file for complete search history.

(56) References Cited

U.S. PATENT DOCUMENTS

| | | | | |
|---|---|---|---|---|
| 2014/0018878 A1* | 1/2014 | Sathaye | ............... | A61B 5/0452 607/25 |
| 2014/0226648 A1* | 8/2014 | Xing | ................... | H04W 56/001 370/350 |
| 2014/0365551 A1* | 12/2014 | Mutschler | ............... | H04L 67/12 709/201 |

* cited by examiner

SENSOR INFORMATION PROCESSING APPARATUS, SENSOR INFORMATION PROCESSING METHOD, AND SENSOR INFORMATION PROCESSING PROGRAM

TECHNICAL FIELD

The present invention relates to a sensor information processing apparatus, a sensor information processing method, and a sensor information processing program, and particularly relates to the sensor information processing apparatus, the sensor information processing method, and the sensor information processing program in a system for wirelessly transmitting measured results from a plurality of sensors.

BACKGROUND ART

As a system using communication service such as wireless LAN, LTE, ZigBee (registered trademark), and Bluetooth (registered trademark), an M2M (Machine to Machine) system is known. In the M2M system, devices mounted with wireless machines exchange information to each other without people, so that the devices are automatically controlled.

As one example of the M2M system, for example, Patent Literature 1 (Japanese Patent Publication No. 4237134) discloses the following technique. That is to say, it is a network system constituted so that a mobile communication network having a wireless terminal, a gateway node capable of wireless communication with the wireless terminal and a position information storage device for holding position information of the wireless terminal is connected with another network to be connected with a terminal which is a transmission destination of a message from the wireless terminal via a gateway. The network system has terminal address holding means for holding an address of the terminal as the transmission destination predetermined for each wireless terminal. When a message is transmitted from the wireless terminal to the terminal, the gateway node receives a wireless frame from the wireless terminal and accesses to the terminal address holding means so as to specify a terminal address of a transmission destination of the message for each wireless terminal and transmits the message to the terminal of the specified transmission destination via the gateway. When the message is transmitted from the terminal to the wireless terminal, the gateway accesses to the position information storage device so as to obtain position information from ID of the wireless terminal and transmit the message to the corresponding gateway node based on the obtained position information. The gateway node transmits the message to the wireless terminal.

CITATION LIST

Patent Literature

Patent Literature 1: Japanese Patent Publication No. 4237134

SUMMARY OF INVENTION

Technical Problem

As one utility form of such an M2M system, a system where a plurality of sensors capable of wirelessly transmitting measured results are installed in facilities or apparatuses in factories, and measured results are collected from the sensors so that facilities or apparatuses in the factories are monitored is considered.

However, in such a system, since the measured results are wirelessly transmitted from the sensors, retransmission of radio signals is occasionally performed depending on a transmission environment of a radio wave. Further, for example, when CSMA/CD (Carrier Sense Multiple Access with Collision Detection) system is employed, radio signals are transmitted from the respective sensors at different timings. In such a case, a timing at which the measurement is actually made in each sensor shifts from a receiving timing of each measured result in an apparatus on a data collecting side.

The present invention is devised in order to solve the above problem, and its object is to provide a sensor information processing apparatus, a sensor information processing method, and a sensor information processing program that enable measured results obtained from a plurality of sensors to be collected and suitably processed in a system to which the measured results are wirelessly transmitted from the sensors.

Solution to Problem

In order to solve the above problem, a sensor information processing apparatus from a certain aspect of the present invention for processing measured results from a plurality of sensors includes a sensing information obtaining section for obtaining sensing information including the measured results in the sensors from radio signals received from the sensors, and a time synchronizing section for temporally relating the measured results included in the sensing information obtained by the sensing information obtaining section to each other.

In order to solve the above problem, a sensor information processing method from a certain aspect of the present invention in a sensor information processing apparatus for processing measured results from a plurality of sensors includes a step of obtaining sensing information including the measured results in the sensors from radio signals received from the sensors, and a step of temporally relating the measured results included in the obtained sensing information to each other.

In order to solve the above problem, a sensor information processing program from a certain aspect of the present invention, which is used in a sensor information processing apparatus for processing measured results from a plurality of sensors, allows a computer to execute a step of obtaining sensing information including the measured results in the sensors from radio signals received from the sensors, and a step of temporally relating the measured results included in the obtained sensing information to each other.

Advantageous Effects of Invention

According to the present invention, in a system to which measured results are wirelessly transmitted from a plurality of sensors, the measured results in the sensors can be collected so as to be suitably processed.

DESCRIPTION OF EMBODIMENTS

First, contents of an embodiment of the present invention will be described.

(1) A sensor information processing apparatus according to the embodiment of the present invention for processing measured results from a plurality of sensors includes a sensing information obtaining section for obtaining sensing information including the measured results in the sensors from radio signals received from the sensors, and a time synchronizing section for temporally relating the measured results included in the sensing information obtained by the sensing information obtaining section to each other.

Since a constitution for temporally relating the measured results wirelessly transmitted from the sensors enables correlation of the measured results in the sensors to be easily determined, failure and disorder of a monitoring target can be properly detected. Further, causes of such failure and disorder can be easily specified. For example, when delay or retransmission of radio signals occurs due to a propagation environment of a radio wave, the correlation of the measured results in the sensors can be easily determined even in a case where radio signals are transmitted from the sensors at different timings or a certain number of the measured results are collectively and wirelessly transmitted in burst for a decrease in power consumption. Therefore, in the system to which the measured results are wirelessly transmitted from the plurality of sensors, the measured results in the sensors can be collected and suitably processed.

(2) Preferably, the sensing information includes times at which the measured results are obtained in the sensors, and the time synchronizing section corrects a part or all of the times included in the sensing information so as to temporally relate the measured results to each other.

In such a constitution, measured results wirelessly transmitted from the sensors can be temporally related to each other in a simple process by using the times included in the sensing information received from the sensors.

(3) More preferably, the sensing information includes the sensing information including relative times at which the measured results are obtained in the sensors, and the sensing information including absolute times at which he measured results are obtained in the sensors. The time synchronizing section performs a correction from the relative times to the absolute times, or a correction from the absolute times to the relative times, so as to temporally relate the measured results to each other.

According to such a constitution, in a system where a sensor without a clock function and a sensor with the clock function coexist, the measured results wirelessly transmitted from the sensors can be temporally related to each other. Further, since it is only necessary to provide a timer function to the sensor and thus not necessary to provide the clock function, the sensor can be miniaturized, its electric power can be saved, and its cost can be reduced.

(4) A sensor information processing method according to the embodiment of the present invention in the sensor information processing apparatus for processing measured results from a plurality of sensors includes a step of obtaining sensing information including the measured results in the sensors from radio signals received from the sensors, and a step of temporally relating the measured results included in the obtained sensing information to each other.

According to such a constitution where the measured results wirelessly transmitted from the sensors are temporally related to each other, correlation of the measured results in the sensors can be easily determined, and thus failure and disorder of a monitoring target can be properly detected. Further, causes of such failure and disorder can be easily specified. For example, when delay and retransmission of radio signals occurs depending on a propagation environment of a radio wave, correlation of measured results in the sensors can be easily determined even in a case where radio signals are transmitted from the sensors at different timings or a certain number of the measured results are collectively and wirelessly transmitted in burst for a decrease in power consumption. Therefore, in the system to which the measured results are wirelessly transmitted from the plurality of sensors, the measured results in the sensors can be collected and suitably processed.

(5) A sensor information processing program according to the embodiment of the present invention to be used in a sensor information processing apparatus for processing measured results from a plurality of sensors allows a computer to execute a step of obtaining sensing information including the measured results in the sensors from radio signals received from the sensors, and a step of temporally relating the measured results included in the obtained sensing information to each other.

Since such a constitution where the measured results wirelessly transmitted from the sensors are temporally related to each other enables the correlation of the measured results in the sensors to be easily determined, failure and disorder of a monitoring target can be properly detected. Further, causes of such failure and disorder can be easily specified. For example, when delay or retransmission of radio signals occurs due to a propagation environment of a radio wave, the correlation of the measured results in the sensors can be easily determined even in a case where radio signals are transmitted from the sensors at different timings or a certain number of the measured results are collectively and wirelessly transmitted in burst for a decrease in power consumption. Therefore, in the system to which the measured results are wirelessly transmitted from the plurality of sensors, the measured results in the sensors can be collected and suitably processed.

An embodiment of the present invention will be described below with reference to the drawings. Like members are denoted by like reference symbols, and description thereof will not be repeated. Further, at least some parts of the embodiment described below may be arbitrarily combined.

[Constitution and Basic Operation]

Figure 1:
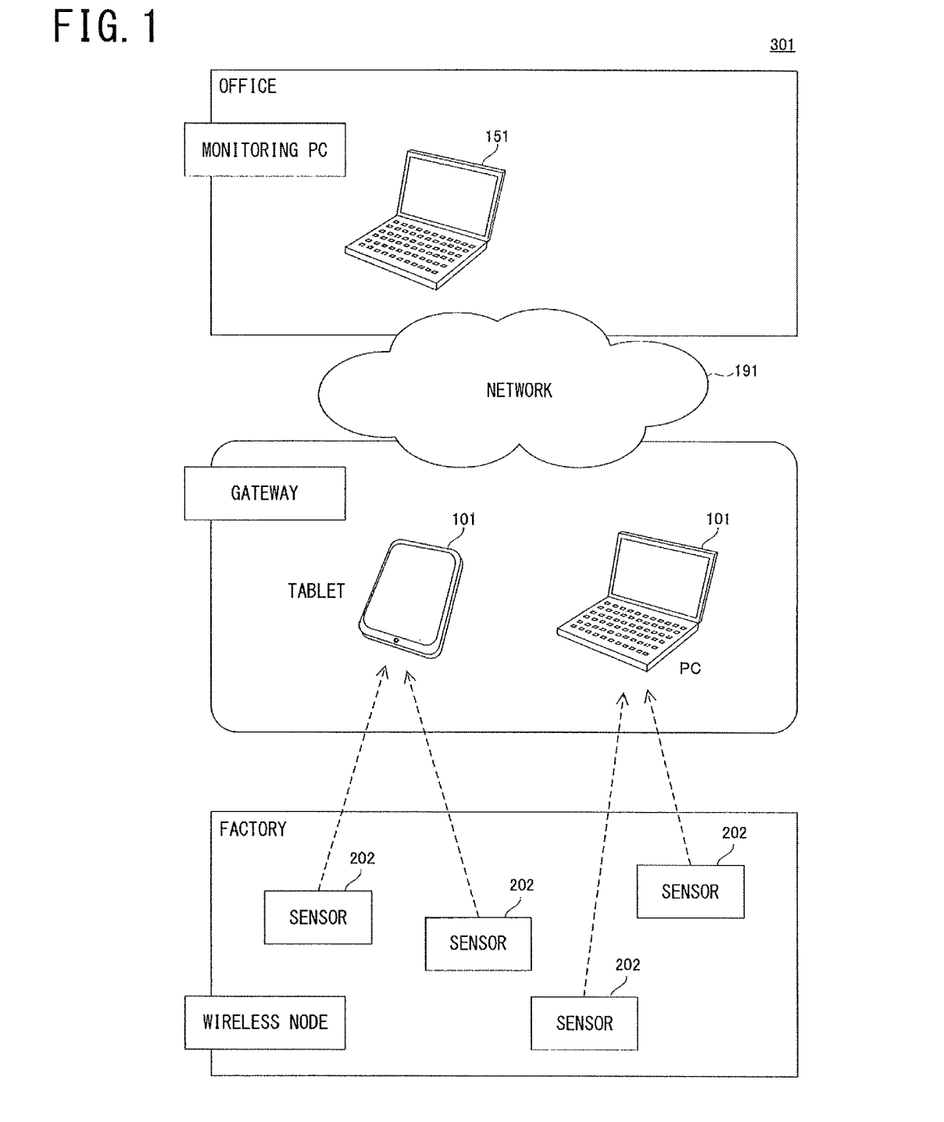
FIG. 1 is a diagram illustrating a constitution of a sensor information processing system according to an embodiment of the present invention.

FIG. 1 is a diagram illustrating a constitution of a sensor information processing system according to an embodiment of the present invention.

A sensor information processing system 301 has a plurality of sensors 202, a gateway 101, and a monitoring PC 151 with reference to FIG. 1.

Each of the sensors 202 corresponding to a wireless node is installed in, for example, a facility or an apparatus in a factory. The sensors 202 measure various characteristics such as temperature, acceleration, sound, and frequency, so as to transmit radio signals including sensing information representing measured results to the gateway 101.

The gateway 101 receives the radio signals from the sensors 202, and transmits sensing information included in the received radio signals to the monitoring PC 151 via a network 191. The gateway 101 is, for example, a tablet or a PC. The sensor information processing system 301 may have a plurality of gateways 101.

The monitoring PC 151 is provided to an office located on a remote place from a factory, and executes a process for monitoring a facility or an apparatus in the factory such as creation of monitoring data based on sensing information received from the gateway 101. A user can monitor an operating condition of a facility or an apparatus, disorder of the facility or the apparatus, manage a manufacturing condition, and detect defective products in the factory using the monitoring data created by the monitoring PC 151.

Various systems such as wireless LAN, LTE, ZigBee (registered trademark), and Bluetooth (registered trademark) can be used for wireless transmission between the sensors 202 and the gateway 101. Further, the network 191 may be a wired network or a wireless network.

Figure 2:
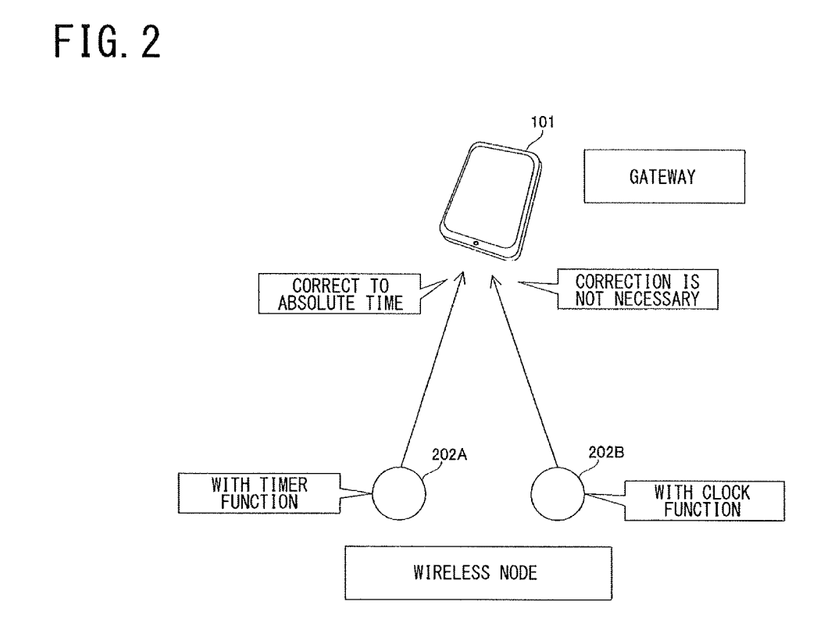
FIG. 2 is a diagram illustrating a type of a sensor in the sensor information processing system according to the embodiment of the present invention.

FIG. 2 is a diagram illustrating types of the sensors in the sensor information processing system according to the embodiment of the present invention.

With reference to FIG. 2, the sensor information processing system 301 has a sensor 200A and a sensor 20B as types of the sensors 202. The sensor 202A has a timer function, and generates sensing information including a relative time, namely, a timer value. The sensor 202B has a clock function, and generates sensing information including an absolute time, namely, a clock value.

Normally, the sensor 202A having the timer function is more inexpensive than the sensor 202B having the clock function.

However, when a measured result of the sensor 202A is compared with a measured result of the sensor 202B with a temporal viewpoint being included, for example, a relative time of the measured result of the sensor 202A should be corrected into an absolute time in the gateway 101. On the other hand, it is less necessary that the time in the measured result of the sensor 202B is corrected in the gateway 101.

Figure 3:
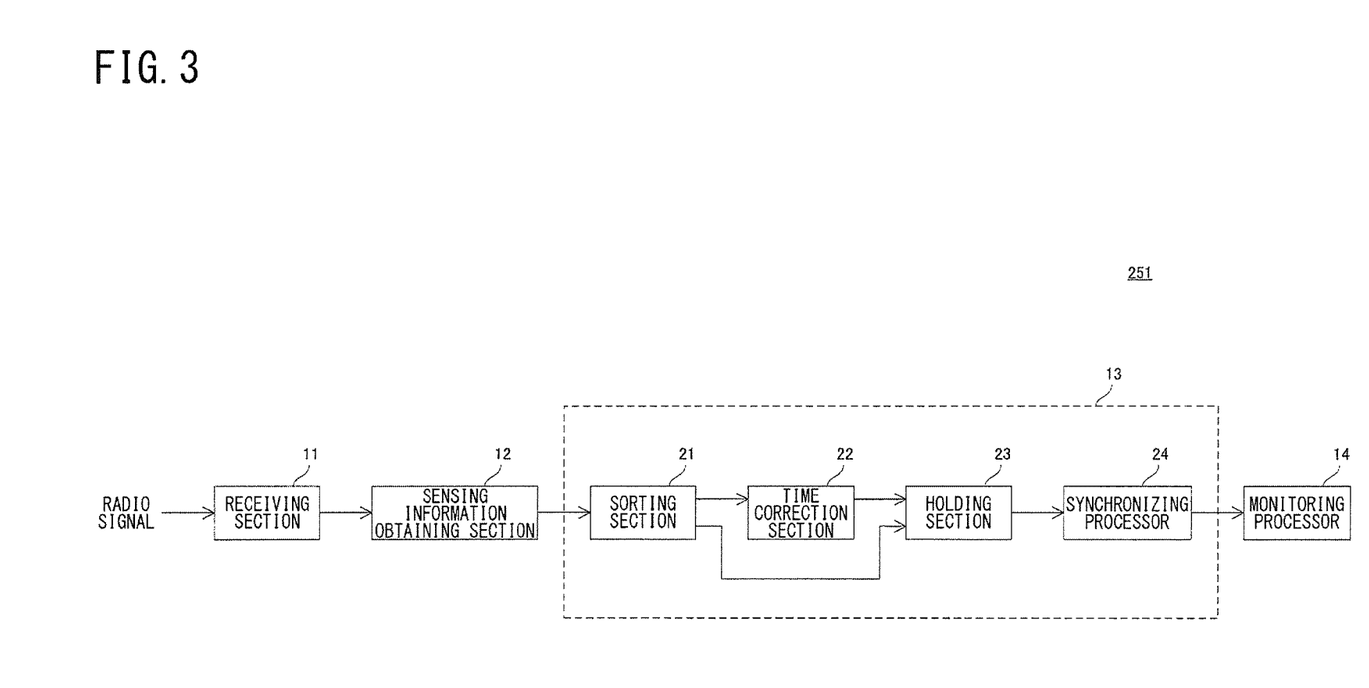
FIG. 3 is a diagram illustrating a constitution of a sensor information processing apparatus in the sensor information processing system according to the embodiment of the present invention.

FIG. 3 is a diagram illustrating a constitution of the sensor information processing apparatus in the sensor information processing system according to the embodiment of the present invention.

With reference to FIG. 3, the sensor information processing apparatus 251 includes a receiving section 11, a sensing information obtaining section 12, a time synchronizing section 13, and a monitoring processor 14. The time synchronizing section 13 includes a sorting section 21, a time correcting section 22, a holding section 23, and a synchronizing processor 24.

The sensor information processing apparatus 251 processes measured results from the plurality of sensors 202. More specifically, the receiving section 11 receives radio signals including sensing information from the sensors 202, frequency-converts the received radio signals into, for example, base-band signals, and converts them into digital signals so as to output them to the sensing information obtaining section 12.

The sensing information obtaining section 12 obtains the sensing information including the measured results in the sensors 202 from the received radio signals from the sensors 202. More specifically, the sensing information obtaining section 12 obtains the measured results in the sensors 202 from the digital signals received from the receiving section 11, namely, extracts the sensing information from the digital signals so as to output the information to the sorting section 21 in the time synchronizing section 13.

The time synchronizing section 13 executes a process for temporally relating the measured results included in the sensing information form the sensors 202 to each other.

For example, the sensing information includes, as described above, times at which the measured results are obtained in the sensors 202. The time synchronizing section 13 corrects some of or all of the times included in the sensing information so as to temporally relate the measured results to each other.

More specifically, as described above, examples of the sensing information are sensing information including relative times at which the measured results are obtained in the sensors 202, and sensing information including absolute times at which the measured results are obtained in the sensors 202.

The time synchronizing section 13 corrects the relative times into the absolute times so as to temporally relate the measured results to each other.

Concretely, in the time synchronizing section 13, the sorting section 21 outputs the sensing information received from the sensor 202A in the sensing information received from the sensing information obtaining section 12, namely, the sensing information including the relative times to the time correcting section 22, and outputs the sensing information received from the sensor 202B, namely, the sensing information including the absolute time to the holding section 23. For example, the sorting section 21 previously retains a correlation between identification information of the sensors 202 and the time function such as the timer function and the clock function in the sensor information processing system 301, and refers to the identification information included in the sensing information from the sensors 202, so as to sort such sensing information. In another manner, for example, the sorting section 21 refers to a flag representing a type of the time function included in the sensing information from the sensors 202 so as to sort such sensing information.

The time correcting section 22 corrects the relative time included in the sensing information received from the sorting section 21, namely, a timer value into an absolute time, namely, a clock time, and outputs the corrected sensing information to the holding section 23.

The synchronizing processor 24 reads plural pieces of sensing information held in the holding section 23, and relates times included in the respective pieces of sensing information so as to temporally relate the measured results included in the sensing information to each other using the times included in the sensing information. The synchronizing processor 24 outputs the measured results of the sensors 202 temporally related to each other to the monitoring processor 14.

The monitoring processor 14 executes a process for monitoring generation of monitoring data based on the measured results received from the synchronizing processor 24.

The time synchronizing section 13 may correct the absolute times into the relative times so as to temporally relate the measured results to each other.

Further, the monitoring processor 14 may be constitution so as to automatically detect failure and disorder of a facility or an apparatus in a factory.

The sensor information processing apparatus 251 is composed of, for example, the gateway 101 and the monitoring PC 151. For example, the gateway 101 includes the receiving section 11, and the monitoring PC 151 includes a monitoring processor 14. Further, the sensing information obtaining section 12, the time synchronizing section 13, and the monitoring processor 14 may be provided to any one of the gateway 101 and the monitoring PC 151, or some of units may be provided to the gateway 101, and other units may be provided to the monitoring PC 151. Further, the gateway 101 and the monitoring PC 151 may be integral with each other.

[Operation]

Information distribution through the sensor information processing system according to the embodiment of the present invention will be described below with reference to the drawings.

The plurality of apparatuses in the sensor information processing system 301 read a program including some of or all of steps of the following sequence from a memory, not shown, and execute them. These programs can be installed from the outside.

Figure 4:
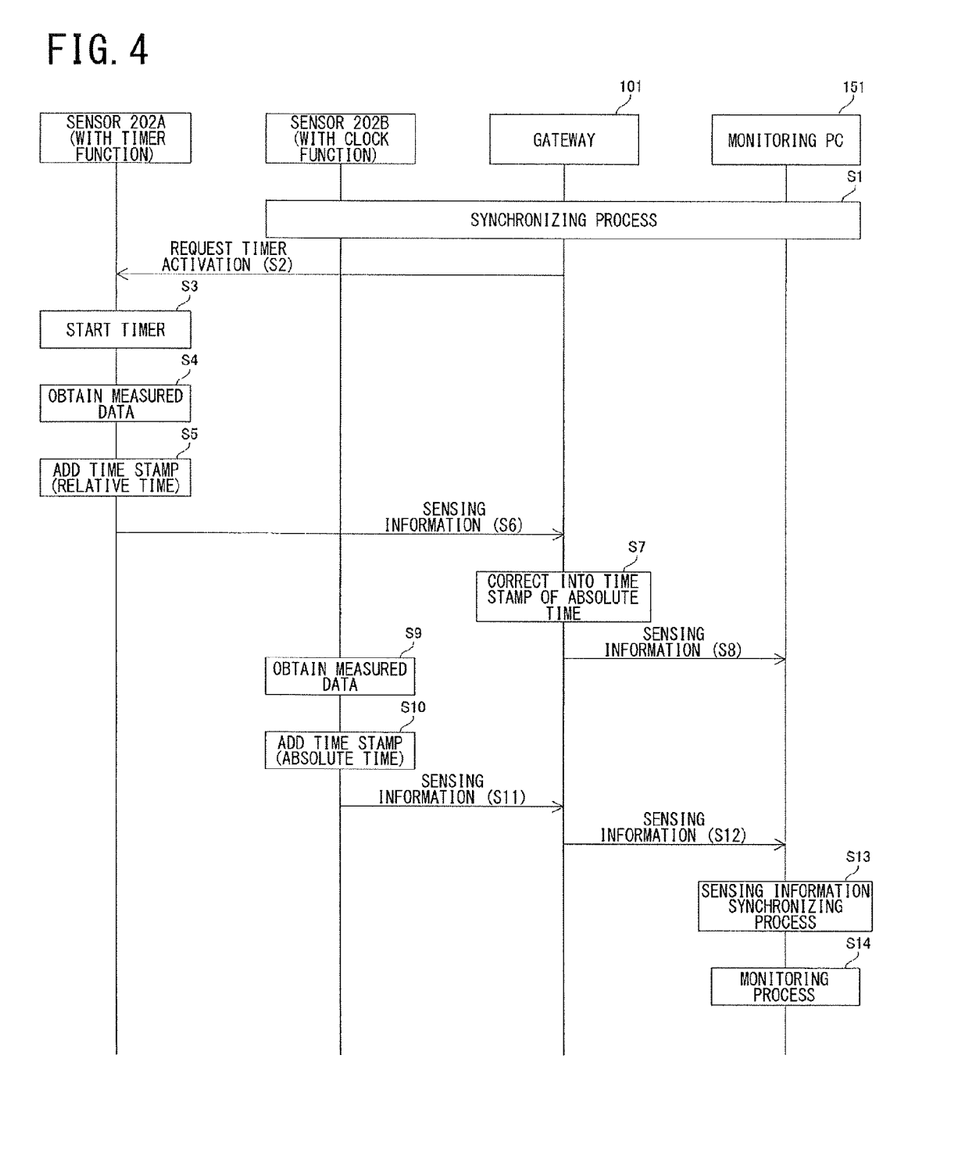
FIG. 4 is a diagram illustrating one example of a sequence of a sensor information process in the sensor information processing system according to the embodiment of the present invention.

FIG. 4 is a diagram illustrating one example of a sequence of a sensor information process in the sensor information processing system according to the embodiment of the present invention. FIG. 4 illustrates a case where the sensor information processing system 301 includes the sensors 202A and 202B, and the gateway 101 corrects times.

With reference to FIG. 4, the sensor 202B, the gateway 101, and the monitoring PC 151 execute a synchronizing process using NTP (Network Time Protocol), and match the respective clock times. When NTP is used, the respective apparatuses may inquire at a server outside the sensor information processing system 301 about the time, or for example, the monitoring PC 151 may have such a server function (step S1).

The gateway 101, then, transmits a timer activating request for activating a timer of the sensor 202A to the sensor 202A. The gateway 101 stores a clock time at which the timer activating request is transmitted (step S2).

When the sensor 202A, then, receives the timer activating request from the gateway 101, it starts a self timer operation (step S3).

The sensor 202A measures a target apparatus, and obtains measured data that is a measured result (step S4).

The sensor 202A adds a time stamp of the timer, namely a relative time to the obtained measured data so as to generate sensing information (step S5), and transmits a radio signal including the generated sensing information to the gateway 101 (step S6).

The gateway 101 corrects the time stamp of the relative time included in the sensing information received from the sensor 202A using the stored time into a time stamp of an absolute time (step S7), and transmits the corrected sensing information to the monitoring PC 151 (step S8).

On the other hand, the sensor 202B takes a measurement on the apparatus, and obtains measured data that is a measured result (step S9).

The sensor 202A adds a time stamp of the clock, namely, the absolute time to the obtained measured data so as to generate sensing information (step S10), and transmits a radio signal including the generated sensing information to the gateway 101 (step S11).

The gateway 101 transmits the sensing information received from the sensor 202B to the monitoring PC 151 (step S12).

The monitoring PC 151 executes a process for synchronizing the sensing information, namely, temporally relates the measured results included in the sensing information to each other using time stamps included in the respective pieces of sensing information (step S13).

The monitoring PC 151 executes a process for monitoring generation of monitoring data based on the measured results temporally related to each other (step S14).

Figure 5:
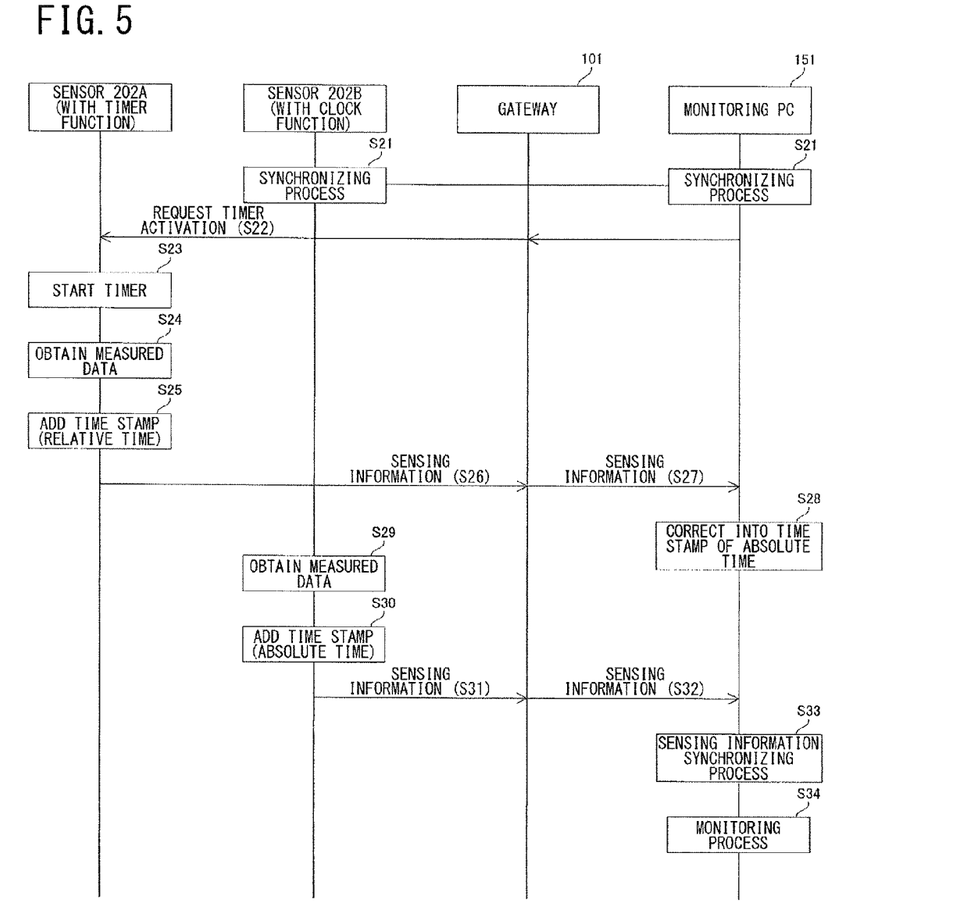
FIG. 5 is a diagram illustrating another example of the sequence of the sensor information process in the sensor information processing system according to the embodiment of the present invention.

FIG. 5 is a diagram illustrating another example of the sequence of the sensor information process in the sensor information processing system according to the embodiment of the present invention. FIG. 5 illustrates a case where the sensor information processing system 301 includes the sensors 202A and 202B, and the monitoring PC 151 corrects times.

With reference to FIG. 5, the sensor 202B and the monitoring PC 151 execute the synchronizing process using NTP (Network Time Protocol) or the like, and make the times of the respective clocks match with each other. When NTP is used, the respective apparatuses may inquire at the server outside the sensor information processing system 301 about the time, and for example, the monitoring PC 151 may have such a server function (step S21).

The monitoring PC 151 transmits the timer activating request for activating the timer of the sensor 202A to the sensor 202A via the gateway 101. The monitoring PC 151 stores the time at which this timer activating request is transmitted (step S22).

When the sensor 202A receives the timer activating request from the gateway 101, it starts a self timer operation (step S23).

The sensor 202A conduct a measurement on, for example, a target apparatus, and obtains measured data that is a measured result (step S24).

The sensor 202A adds a time stamp of the timer, namely, a relative time to the obtained measured data so as to generate sensing information (step S25), and transmits a radio signal including the generated sensing information to the gateway 101 (step S26).

The gateway 101 transmits the sensing information received from the sensor 202A to the monitoring PC 151 (step S27).

The monitoring PC 151 corrects the time stamp of the relative time included in the sensing information received from the gateway 101 into the time stamp of the absolute time using the stored time (step S28).

On the other hand, the sensor 202B conducts a measurement on, for example, a target apparatus, and obtains measured data that is a measured result (step S29).

The sensor 202A adds a time stamp of the clock, namely the absolute time, to the obtained measured data so as to generate sensing information (step S30), and transmits a radio signal including the generated sensing information to the gateway 101 (step S31).

The gateway 101 transmits the sensing information received from the sensor 202B to the monitoring PC 151 (step S32).

The monitoring PC 151 executes the sensing information synchronizing process, namely, temporally relates the measured results included in the respective pieces of sensing information to each other using the time stamps included in the respective pieces of sensing information (step S33).

The monitoring PC 151 executes the process for monitoring generation of monitoring data based on the measured results temporally related to each other (step S34).

In a sequence shown in FIG. 5, the synchronizing process in the gateway 101 between the sensor 202B and the monitoring PC 151 is not necessary in comparison with the sequence shown in FIG. 4.

Figure 6:
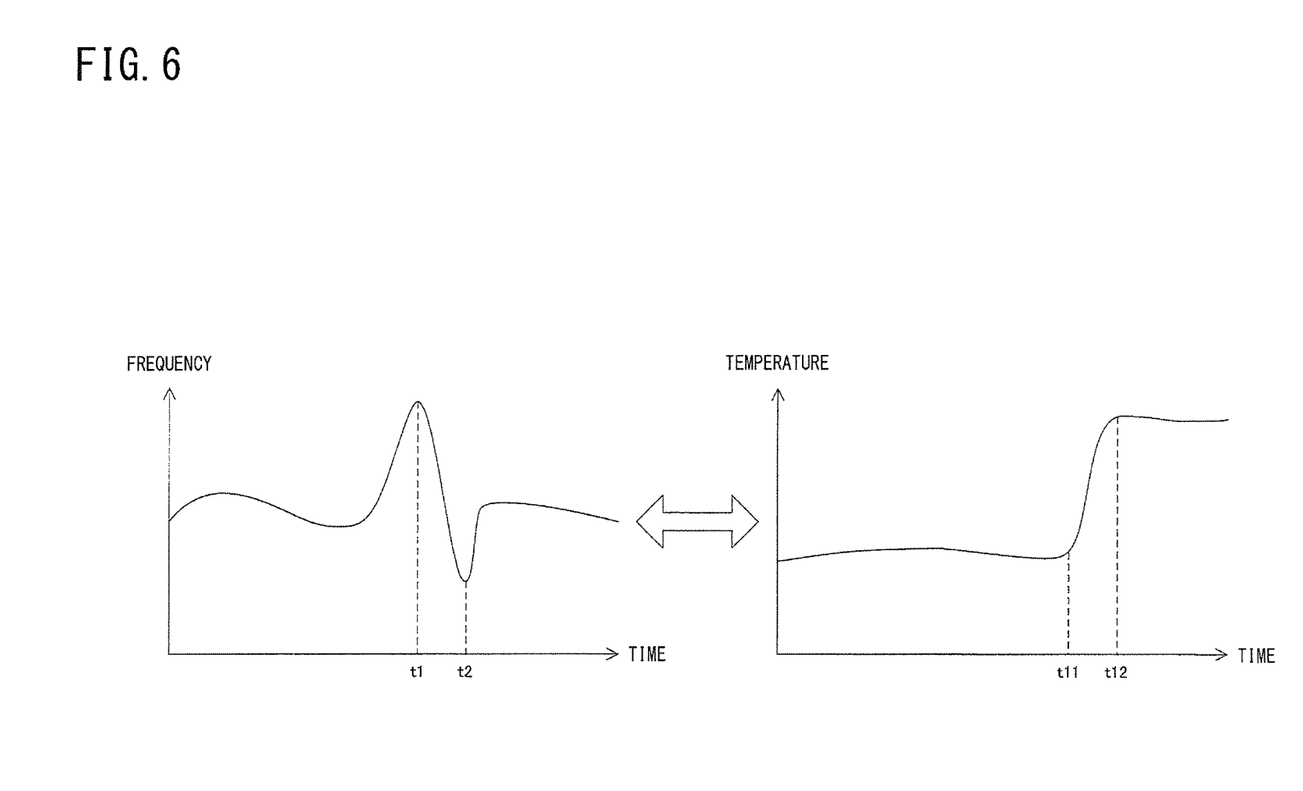
FIG. 6 is a diagram for explaining an effect of a sensing information synchronizing process in the sensor information processing apparatus according to the embodiment of the present invention.

FIG. 6 is a diagram for explaining an effect of a sensing information synchronizing process in the sensor information processing apparatus according to the embodiment of the present invention.

Normally, the temporal synchronization of the sensing information is necessary in order to detect events of the facility or the apparatus, namely, failure and disorder from the sensing information of the sensors 202.

With reference to FIG. 6, for example, when measured results of a temporal change in a frequency and a temporal change in a temperature in certain facility or device are obtained, and both the measured results are not temporally synchronized, correlations of the respective measured results are not understood. That is to say, since a frequency and a temperature that are measured at a certain timing are not clear, it is difficult to correctly detect failure and disorder of the facility or the apparatus.

On the contrary, in the sensor information processing apparatus 251, the measured results of the sensors 202 are temporally related to each other by using the times included in the sensing information. As a result, it is understood, for example, that times t1 and t2 in the temporal change in the frequency are related to times t11 and t12 in the temporal change in the temperature. As a result, it can be easily determined that a correlation exists in abrupt changes of the frequency and the temperature, and failure and disorder of the facility or the apparatus can be properly detected. Further, causes of such failure and disorder can be easily specified.

In a system where a plurality of sensors capable of wirelessly transmitting measured results is mounted to, for example, a facility or an apparatus in a factory and the measured results are collected from the sensors so that the facility or the apparatus in the factory are monitored, since the measured results are wirelessly transmitted from the sensors, radio signals are occasionally retransmitted depending on propagation environment of a radio wave. Further, for example, when a CSMA/CD (Carrier Sense Multiple Access with Collision Detection) system is employed, radio signals are transmitted from the sensors at different timings. In such a case, a timing at which a measurement is actually conducted in each sensor shifts from a timing at which the measured result is received in the apparatus on the data collecting side.

On the contrary, in the sensor information processing apparatus according to the embodiment of the present invention, the sensing information obtaining section 12 obtains sensing information including the measured results in the sensors 202 from the radio signals received from the sensors 202. The time synchronizing section 13 temporally relates the measured results included in the sensing information in the sensors 202 to each other.

A constitution where the measured results wirelessly transmitted from the sensors 202 are temporally related to each other enables the correlation of the measured results in the sensors 202 to be easily determined. For this reason, failure and disorder of a target to be monitored can be appropriately detected. Further, causes of such failure and disorder can be easily specified.

For example, when delay or retransmission of radio signals occurs due to a propagation environment of a radio wave, the correlation of the measured results in the sensors 202 can be easily determined even in a case where radio signals are transmitted from the sensors at different timings or a certain number of the measured results are collectively and wirelessly transmitted in burst for a decrease in power consumption.

Therefore, in the sensor information processing apparatus according to the embodiment of the present invention, the system to which measured results are wirelessly transmitted from the plurality of sensors can collect and appropriately process the measured results in the sensors.

Further, in the sensor information processing apparatus according to the embodiment of the present invention, the sensing information includes the times at which the measured results are obtained in the sensors 202. The time synchronizing section 13 corrects some of or all of the times included in the respective pieces of sensing information so as to temporally relate the measured results to each other.

Such a constitution enables the measured results wirelessly transmitted from the sensors 202 to be temporally related to each other using the times included in the sensing information received from the sensors 202 through a simple process.

Further, in the sensor information processing apparatus according to the embodiment of the present invention, as the sensing information, the sensing information including relative times at which the measured results are obtained in the sensors 202, and the sensing information including absolute times at which the measured results are obtained in the sensors 202 are present. The time synchronizing section 13 corrects the relative times into the absolute times, or corrects the absolute times into the relative times, so that the measured results are temporally related to each other.

Such a constitution enables the measured results wirelessly transmitted from the sensors 202 to be temporally related to each other in the system where the sensors 202 without the clock function and the sensors 202 with the watch function coexist. Further, since it is only necessary to provide the timer function to the sensors 202 and the clock function does not have to be provided to the sensors 202, the sensors 202 can be miniaturized, an electric power can be saved, and a cost can be reduced.

In the sensor information processing apparatus according to the embodiment of the present invention, the time synchronizing section 13 is constituted so as to temporally relate the measured results obtained by sensors whose frequencies and temperatures vary to each other, but the constitution is not limited to this. The time synchronizing section 13 may be constituted so as to temporally relate measured results obtained by a plurality of sensors of different types such as temperature sensors mounted to different apparatuses or facilities, respectively, to each other.

Targets to be monitored by the sensor information processing system according to the embodiment of the present invention are not limited to facilities or apparatuses in a factory, and may be various infrastructures.

The above embodiment should be considered to be illustrative and not to be restrictive from all aspects. The scope of the present invention is described not by the above description but claims, and is intended to include all changes in meanings and scope equivalent to the claims.

REFERENCE SIGNS LIST

11: receiving section
12: sensing information obtaining section
13: time synchronizing section
14: monitoring processor
21: sorting section
22: time correcting section
23: holding section
24: synchronizing processor
101: gateway
151: monitoring PC
191: network
202, 202A, 202B: sensor
251: sensor information processing apparatus
301: sensor information processing system

The invention claimed is:

1. A sensor information processing apparatus for processing measured results from a plurality of sensors including a plurality of types of sensors having different expressions of time,
the sensor information processing apparatus comprising:
a sensing information obtaining section for obtaining sensing information including measured results in the plurality of types of sensors and times at which the measured results are obtained in the plurality of types of sensors, the sensing information being obtained from radio signals received from the plurality of sensors; and
a time synchronizing section for unifying the expressions of time so as to temporally relate the measured results to each other,
the measured results being included in the sensing information obtained by the sensing information obtaining section,
wherein the time synchronizing section corrects some or all of the times included in the sensing information so as to temporally relate the measured results to each other,
the sensing information including relative times and absolute times at which the measured results are obtained in the sensors, and,
the time synchronizing section corrects the relative times into the absolute times, or corrects the absolute times into the relative times so as to temporally relate the measured results to each other, and
the time synchronizing section comprises a sorting section configured to sort the sensing information including relative times and the sensing information including absolute times,
the sensing information including relative times and the sensing information including absolute times being sorted in accordance with information included in the sensing information.

2. A sensor information processing method in a sensor information processing apparatus for processing measured results from a plurality of sensors including a plurality of types of sensors having different expressions of time, the method comprising:

a step of obtaining sensing information including the measured results in the sensors and times at which the measured results are obtained in the plurality of types of sensors,
the sensing information being obtained from radio signals received from the plurality of sensors; and
a step of unifying the expressions of time so as to temporally relate the measured results included in the obtained sensing information to each other,
wherein in the step of unifying the expressions of time, some or all of the times included in the sensing information are corrected to temporally relate the measured results to each other,
the sensing information including relative times and absolute times at which the measured results are obtained in the sensors, and
in the step of unifying the expressions of time, the relative times are corrected into the absolute times to temporally relate the measured results to each other, or the absolute times are corrected into the relative times to temporally relate the measured results to each other, and the step of unifying the expressions of time includes a step of sorting the sensing information including relative times and the sensing information including absolute times,
the sensing information including relative times and the sensing information including absolute times being sorted in accordance with information included in the sensing information.

3. A non-transitory computer readable medium, comprising sensor information processing instructions to be used in a sensor information processing apparatus for processing measured results from a plurality of sensors including a plurality of types of sensors having different expressions of time, the instructions allowing a computer to execute:
a step of obtaining sensing information including the measured results in the sensors and times at which the measured results are obtained in the plurality of types of sensors,
the sensing information being obtained from radio signals received from the plurality of sensors; and
a step of unifying the expressions of time so as to temporally relate the measured results included in the obtained sensing information to each other,
wherein in the step of unifying the expressions of time, some or all times included in both of the sensing information are corrected to temporally relate the measured results to each other,
the sensing information including relative times and absolute times at which the measured results are obtained in the sensors, and
in the step of unifying the expressions of time, the relative times are corrected into the absolute times to temporally relate the measured results to each other, or the absolute times are corrected into the relative times to temporally relate the measured results to each other, and the step of unifying the expressions of time includes a step of sorting the sensing information including relative times and the sensing information including absolute times,
the sensing information including relative times and the sensing information including absolute times being sorted in accordance with information included in the sensing information.

* * * * *